United States Patent [19]

Bandhopadhyay

[11] Patent Number: 4,750,361
[45] Date of Patent: Jun. 14, 1988

[54] UNIVERSAL BALANCING MACHINE

[75] Inventor: Deb K. Bandhopadhyay, Rochester Hills, Mich.

[73] Assignee: General Motors Corporation, Detroit, Mich.

[21] Appl. No.: 4,866

[22] Filed: Jan. 20, 1987

[51] Int. Cl.$^4$ .................. G01M 1/02; G01M 1/16
[52] U.S. Cl. ............................... 73/462; 73/477; 73/478
[58] Field of Search ............... 73/460, 462, 472, 473, 73/474, 475, 476, 477, 471, 478, 479; 354/480

[56] References Cited

U.S. PATENT DOCUMENTS

| | | | |
|---|---|---|---|
| 1,546,030 | 7/1925 | Schmidt | 73/477 |
| 3,213,689 | 10/1965 | Cain et al. | 73/462 |
| 4,162,633 | 7/1979 | Muller | 73/462 |
| 4,381,670 | 5/1983 | Schneider | 73/471 |
| 4,445,373 | 5/1984 | Mueller | 73/473 |
| 4,495,811 | 1/1985 | Muller et al. | 73/462 |

FOREIGN PATENT DOCUMENTS

| | | | |
|---|---|---|---|
| 446481 | 4/1936 | United Kingdom | 73/477 |
| 861164 | 2/1961 | United Kingdom | 73/460 |

Primary Examiner—Stewart J. Levy
Assistant Examiner—Robert P. Bell
Attorney, Agent, or Firm—Ernest E. Helms

[57] ABSTRACT

The present invention provides a universal balance machine which can be utilized as a hard or soft balancing machine. Since the stiffness of the machine suspension is easy and readily changed, hard and soft balancing may be done on the same machine.

4 Claims, 2 Drawing Sheets

UNIVERSAL BALANCING MACHINE

FIELD OF THE PRESENT INVENTION

The field of the present invention is that of balancing machines. More particularly the field of the present invention is of balancing machines capable of balancing in both single and multiple planes.

DISCLOSURE STATEMENT

Balancing machines, commonly referred to as centrifugal balancing machines are of two major types. The first type is the soft suspension machine, sometimes referred to as soft bearing. The second type of balancing machine is the hard suspension machine, commonly referred to as hard bearing machine.

The soft suspension balancing machine derives its name from the fact that it supports the rotor (or other work piece such as a camshaft) to be balanced on a support structure (commonly referred to as a bearing block) which is flexibly mounted on a suspension system permitting the system to vibrate freely in at least one direction, usually horizontal, perpendicular to the rotor rotational axis. The balancing machine will usually have two bearing block-suspension support structures axially separated along the rotors rotational axis. The resonance (natural frequency) of the rotor to be balanced and of the bearing block occurs at one-half or less of the lowest balancing speed (see FIG. 1). By the time that the balancing machine has accelerated the rotor to the balancing speed, the angle of the vibrational lag and the vibrational amplitude have stabilized so that they can be measured with reasonable certainty. The bearing block (and the directly attached support components) vibrate in unison with the rotor, thus adding to the mass of the rotor. Restriction of vertical motion of the rotor does not affect the amplitude of vibration of the rotor in the horizontal plane, but the added mass of the bearing block does. The greater the combined rotor and bearing block mass, the smaller will be the displacement of the bearing block. Therefore, the mass of a given rotor will affect the amplitude of vibration of a bearing block in a soft suspension machine. Because of the above factors, a direct indication of unbalance can only be obtained after calibrating the sensors for a given rotor of a given weight and configuration by use of a test mass which constitutes a known amount of imbalance.

The soft bearing balancing machine instrumentation contains the necessary circuitry and controls so that, upon proper calibration for the particular rotor to be balanced, an exact indication of imbalance and the angular position of the imbalance can be obtained. Calibration of the machine must be varied for parts of different mass and configuration, since displacement of the principle axis of inertia in the bearing blocks is dependent upon rotor mass, bearing block mass (including the mass of the suspension system supporting the bearing block), the rotor moment of inertia and the distance between bearing blocks. To state the above more simply, any change in rotor mass or shape or position of bearing block support structure when balancing a rotor requires that the soft bearing balancing machine be recalibrated.

Hard suspension, commonly referred to as hard-bearing, balancing machines are essentially of the same construction as soft suspension balancing machines, except that the bearing block support structure is significantly stiffer in the transverse horizontal direction (plane). The above results in a horizontal natural frequency for the machine which occurs at a frequency several orders of a magnitude higher than that for a comparable soft suspension balancing machine. The hard suspension balancing machine is designed to operate at speeds well below its natural frequency in an area where the phase angle lag is constant and practically zero (see FIG. 2), and where the amplitude of vibration, though small, is directly proportional to the centrifugal forces produced by the unbalance.

Since the force that a given amount of unbalance exerts at a given speed is always the same, no matter whether the unbalance occurs in a short, long, light or heavy rotor, the output from the sensors attached to the balancing machine bearing block remains proportional to the centrifugal force resulting from the unbalance in the rotor. The output is not influenced by bearing mass, rotor mass, or inertia so that a permanent relation between the unbalance and sensing elements output can be established.

Centrifugal force from a given unbalance rises with the square of the balancing speed. Therefore, unlike the soft suspension balancing machine, the hard suspension machine does not require the use of a calibration mass (master) to calibrate the machine for a given rotor.

For soft suspension balancing machines, the rotor speed range starts at approximately twice the natural frequency of the rotor and the bearing block support structure. For hard balancing machines the combined rotor bearing support structure has a natural frequency commonly three times greater than the maximum balancing speed.

Both soft and hard balancing machines use various types of sensing elements at the rotor-bearing support to convert mechanical vibrations into an electrical signal. The sensing elements used can be velocity sensors, magneto-restrictive piezoelectric sensors or other types of indication sensors.

The primary advantage of the hard suspension machine is permanent calibration. The primary advantage of the soft suspension machine is its sensitivity, however its disadvantage is the need to be calibrated each time the weight or geometry of the work piece (rotor) is changed. It is not uncommon for manufacturers to purchase balancing services from an outside supplier. Usually the outside supplier will be given specific instructions to balance the work piece on a hard or soft suspension machine. Therefore for the outside supplier it is highly desirable to provide a balancing machine which can be used for hard or soft balancing thereby deleting the required expense at two separate machines.

SUMMARY OF THE INVENTION

To meet the above noted and other desires the present invention is brought forth. The present invention provides a balancing machine wherein the stiffness of the bearing block support structure may be readily and easily changed. In its normal operating mode the balancing machine of the present invention is provided with a soft suspension allowing a fair amount of vibrational travel in the horizontal direction transverse to the axis of the rotor to be balanced. The present invention also provides a means to selectively restrain the horizontal movement of the bearing supports thereby providing a hard suspension. In an embodiment of the present invention to be later described the conversion from the soft to the hard suspension may be effected by simple rotation of a hand lever.

It is an object of the present invention to provide an apparatus and method of utilization of the same of a balancing machine with a hard and soft suspension capability.

It is an object of the present invention to provide a convertible hard-soft work piece balancing machine, the machine including a first structure having a first natural frequency providing a soft support for the work piece, power means to rotate the work piece, means for detecting the balance of the work piece at the first structure, means for selectively restraining vibration of the first structure whereby the natural frequency of the first structure is significantly increased providing a hard support for the work piece.

It is also another object of the present invention to provide a convertible hard-soft work piece balancing machine, the machine including a first structure having a first natural frequency providing a soft support for the work piece, a first rod connected with the first structure having a flanged end, power means to rotate the work piece, means for detecting the unbalance of the work piece at the first structure, and a side support with clamping means selectively engageable with the flanged end of the first rod for restraining vibration of the first structure whereby the natural frequency of the first structure is significantly increased providing a hard support for the work piece.

It is also another object of the present invention to provide a method of balancing a work piece in a hard-soft balancing machine, the method including supporting the work piece on a first structure having a first natural frequency, rotating the work piece, detecting the unbalance of the work piece at the first structure, and selectively restraining vibration of the first structure whereby the natural frequency of the first structure is significantly increased providing a hard support for the work piece.

Other objects, desires and advantages of the present invention will become more apparent to those skilled in the art as the nature of the invention is better understood from the accompanying drawings and a detailed description.

DETAILED DESCRIPTION OF THE DRAWINGS

Figure 3:
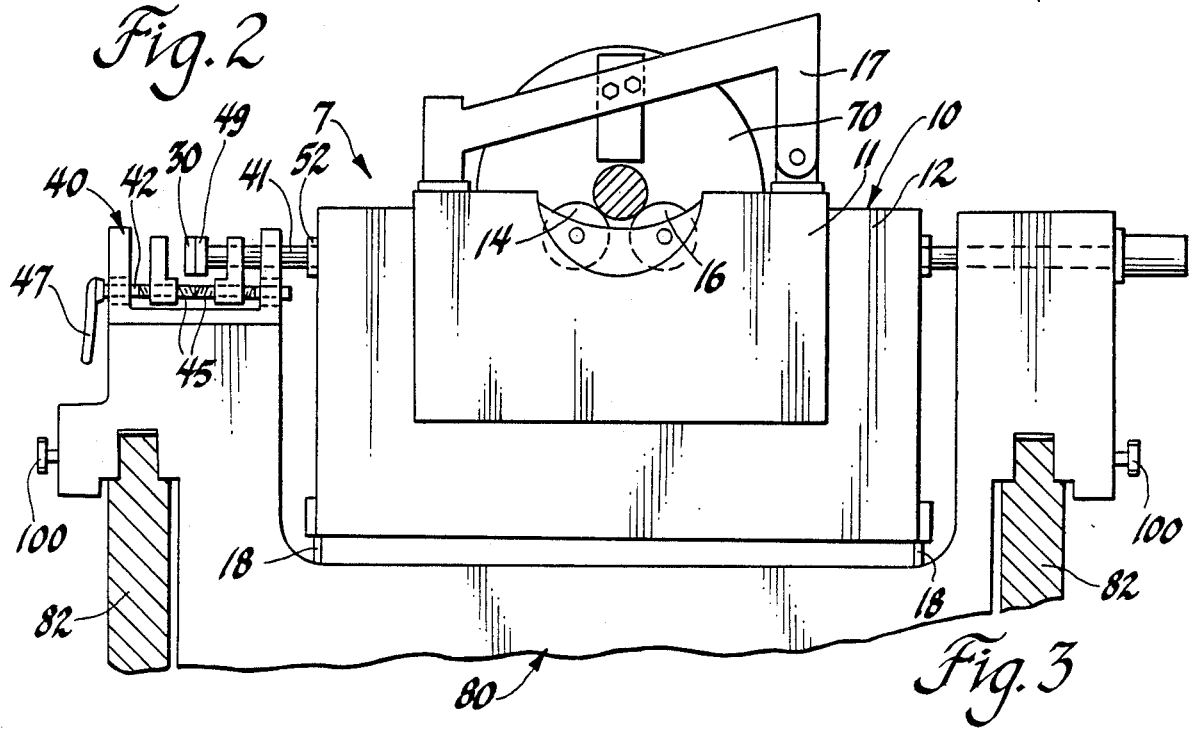
FIG. 3 is a view taken along line 3—3 of FIG. 4.
Figure 4:
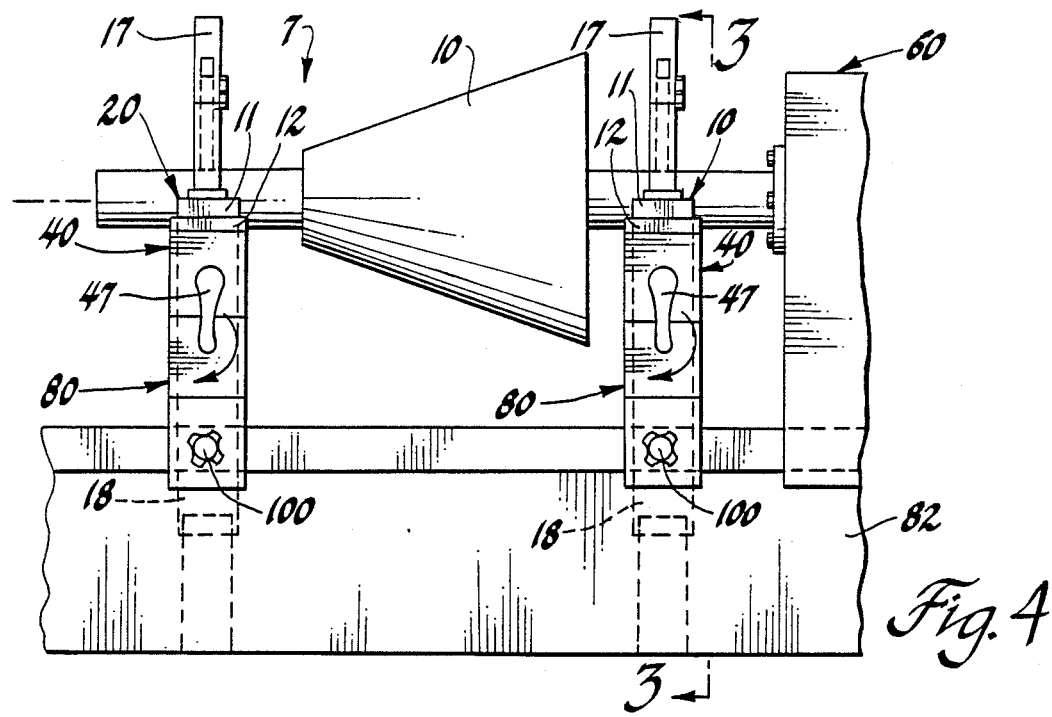
FIG. 4 is a front elevational view of a preferred embodiment balancing machine of the present invention.

Referring to FIGS. 3 and 4 the balancing machine 7 of the present invention has at least four major elements. The first element is the power means 60 to rotate the work piece, rotor 70. The power means 60 is typically an electric motor which spins the rotor 70. The next portion of the invention is the first bearing block support structure 10. The first bearing block support structure has a first natural frequency providing a soft support for the rotor 70. A sensor 30, providing the means for detecting the imbalance of the work piece at the first bearing block support 10, is the third major element. The last element is the means for selectively restraining vibration of the first structure 40.

Figure 1:
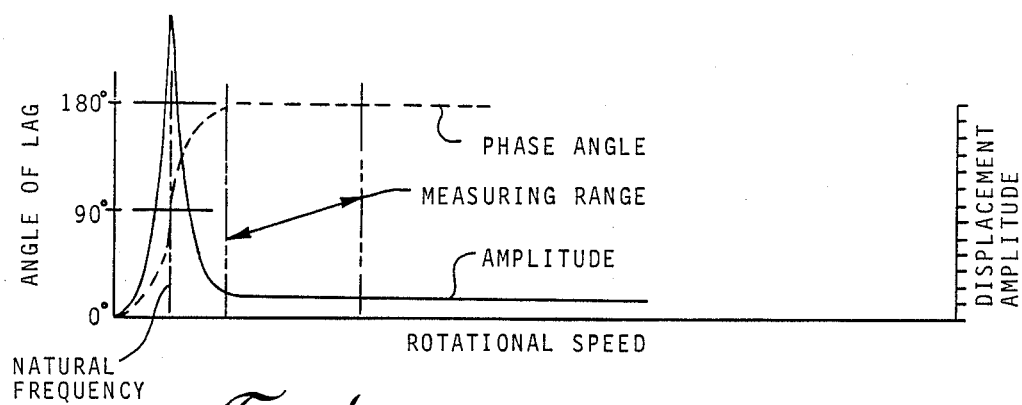
FIGS. 1 and 2 illustrate the dynamic characteristic of soft and hard balancing machines respectively.
Figure 2:
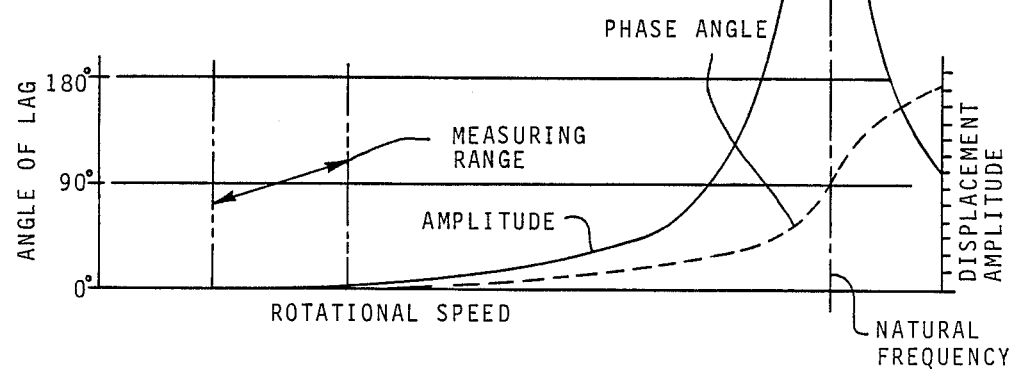

The first bearing support structure 10 has a bearing 12 block frame with a removable insert 11 having two rollers 14 and 16. Rollers 14 and 16 have rotational axis parallel with the rotational axis of rotor 70. The bearing block 12 is supported on a spring suspension 18. As illustrated in FIG. 3, springs 18 are relatively short and are underneath the bearing block; however, the present invention can utilize suspension springs that are more elongated and or support the bearing block in a hanging fashion from above. The first bearing support structure 10 has an overhead beam structure 17 which restrains the rotor 70 from vibrating in the vertical direction. The first bearing support structure 10 has a soft natural frequency provided by the suspension springs 18 as represented by FIG. 1. Since balancing is usually desirable in at least two planes along the rotor's axis a second bearing block support structure 20 substantially similar if not identical to the first bearing block structure 10 is typically provided.

A sensor 30 is provided for detecting the unbalance of the work piece at the respective bearing block support structures. When the balancing machine is in the soft mode, the sensor 30 can often include a velocity pick up and the velocity signal is used to compute the imbalance. When the balancing machine is used in its hard mode, the sensor 30 often includes a piezoelectric device.

The bearing block support structure is mounted on side support 80. Side support 80 is adjustably affixed with the floor railing 82 by handles 100. On top of the side support is the means 40 for selectively restricting the bearing block support structure. Restraining the movement of the bearing block support structure 10 in the horizontal plane significantly raises the natural frequency of the bearing block support structure 10 thereby causing the bearing block support structure 10 to provide a hard support.

Figure 5:
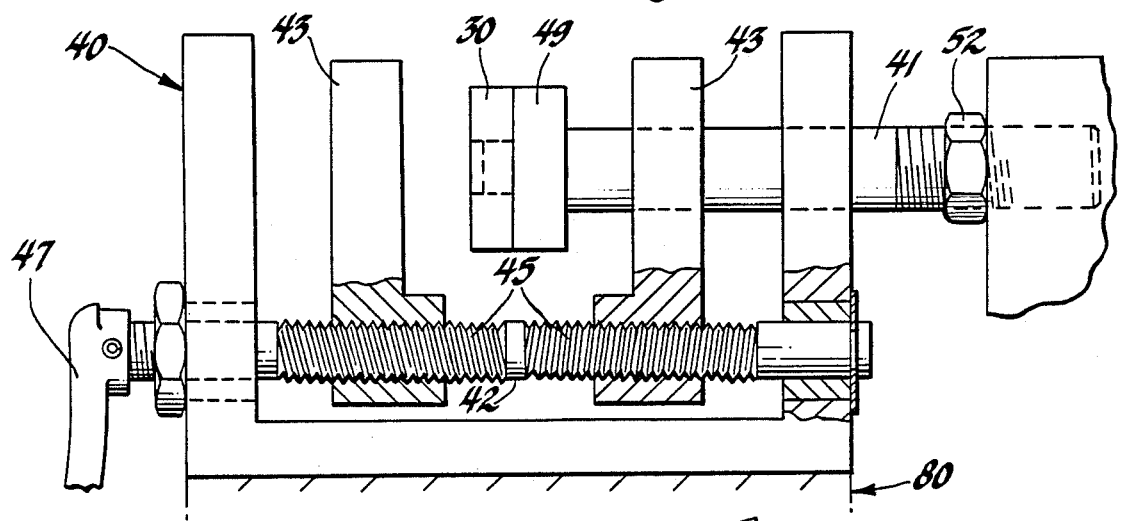
FIG. 5 is a fragmentary enlarged sectional view mainly in side elevation of a portion of FIG. 3.

Referring additionally to FIG. 5, the bearing block support structure 10 has fixably connected thereto a rod 41 having a flanged end 49.

Rotatably mounted on top of the side support 80 is a second rod 42 having converging threaded portions 45. Threadably mounted on the threaded portions of the second rod 42 are a pair of clamping members 43. By rotating the rod 42 via the handle 47 the clamping members may be selectively brought into engagement with a flange 49 of the first rod 41. The first rod projects through one of the clamping members 43 and when the balancing machine 7 is being utilized in the soft mode the rod 41 is allowed freely to vibrate freely in the horizontal plane. When desiring to place the balancing machine 7 in the hard mode the two clamping members 43 are brought into engagement with the flange 49 of the first rod 41. When the clamping members 43 selectively engage the flange 49, the rod 41 is vibrationally restrained. The restraint of rod 41 also restrains the bearing block support structure 10 and increases the natural frequency of the bearing block support structure 10. If sensor 30 is a piezoelectric transducer, sensor 30 will be simultaneously preloaded by the engagement of the clamping members 43 with flange 49.

The first rod 41 is also threaded and has a surrounding nut 52 to allow for fine tune adjustments of the position of the flange 49. Adjustment of the position of flange 49 assures the proper preloading of the sensor 30 (when using a piezoelectric sensor).

Figure 6:
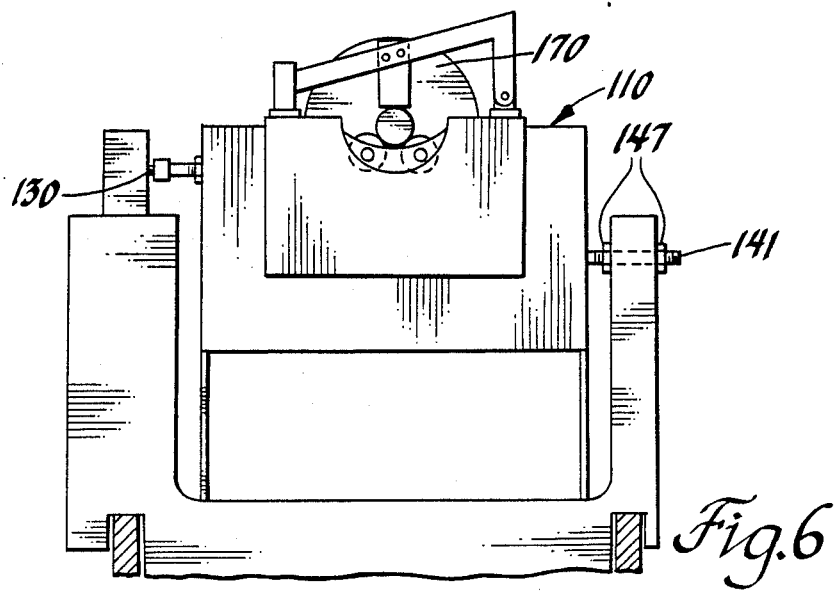
FIG. 6 is a front elevational view of an alternative embodiment to the present invention.

FIG. 6 reveals a balancing machine substantially the same as that illustrated in FIG. 3. However the first rod 141 is placed on the opposite side of the rotor 170 piezoelectric sensor 130. Rod 141 is fixably connected with the bearing block support structure 110. Using jam nuts 147, rod 141 can be used to restrain bearing block support structure 110 and to preload piezoelectric sensor 130. The above provides a hard mode operation. Jam nuts 147 can be positioned to allow bearing block support structure 110 and rotor 170 to move freely in the horizontal plane, thereby providing a soft support.

The present invention provides a method of balancing a work piece in a hard-soft balancing machine which includes the following steps:

1. Supporting the work piece 70 on a first bearing support structure 10 having a first natural frequency;
2. Rotating the work piece;
3. Detecting 30 the unbalance of said work piece at the first bearing support structure; and
4. Selectively restraining 40 the first bearing support structure 10 whereby the natural frequency of the first bearing support structure 10 is significantly increased providing a hard support for the work piece 70.

While a few of the embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A convertible hard-soft work piece balancing machine, said machine in combination comprising:
    a first structure having a first natural frequency providing a soft support for said work piece;
    a first rod connected with said first structure having a flanged end;
    power means to rotate said work piece;
    means for detecting the unbalance of said work piece at said first structure; and
    a side support having a rotatively mounted second rod with converging threaded portions and first and second clamp members threaded on said threaded portions wherein rotation of said second rod causes said clamps to selectively engage with said flanged end of said first rod for restraining vibration of said first structure whereby the natural frequency of said first structure is significantly increased providing a hard support for said work piece.

2. A balancing machine as described in claim 1 wherein the engagement of said clamps with the flanged portion of said first rod also preloads a piezoelectric transducer which is in turn utilized as the means to detect imbalance of said work piece when said first structure is providing a hard support.

3. A convertible hard-soft work piece balancing machine, said machine in combination comprising:
    a first structure having a first natural frequency providing a soft support for said work piece;
    power means to rotate said work piece;
    means for detecting the unbalance of said work piece at said first structure including at least one piezoelectric transducer; and
    means for selectively restraining vibration of said first structure and preloading said piezoelectric transducer whereby the natural frequency of said first structure is significantly increased providing a hard support for said work piece.

4. A method of balancing a work piece in a hard-soft balancing machine, said method in combination comprising:
    supporting said work piece on a first structure having a first natural frequency;
    rotating said work piece;
    detecting the unbalance of said work piece at said first structure; and
    simultaneously selectively restraining vibration of said first structure and preloading a piezoelectric transducer which provides the means for detecting the unbalance of said work piece at first structure whereby the natural frequency of said first structure is significantly increased providing a hard support for said work piece.

* * * * *